March 24, 1942.   W. J. HUMPHREYS   2,277,438
MOTION PICTURE SYSTEM
Filed April 19, 1941
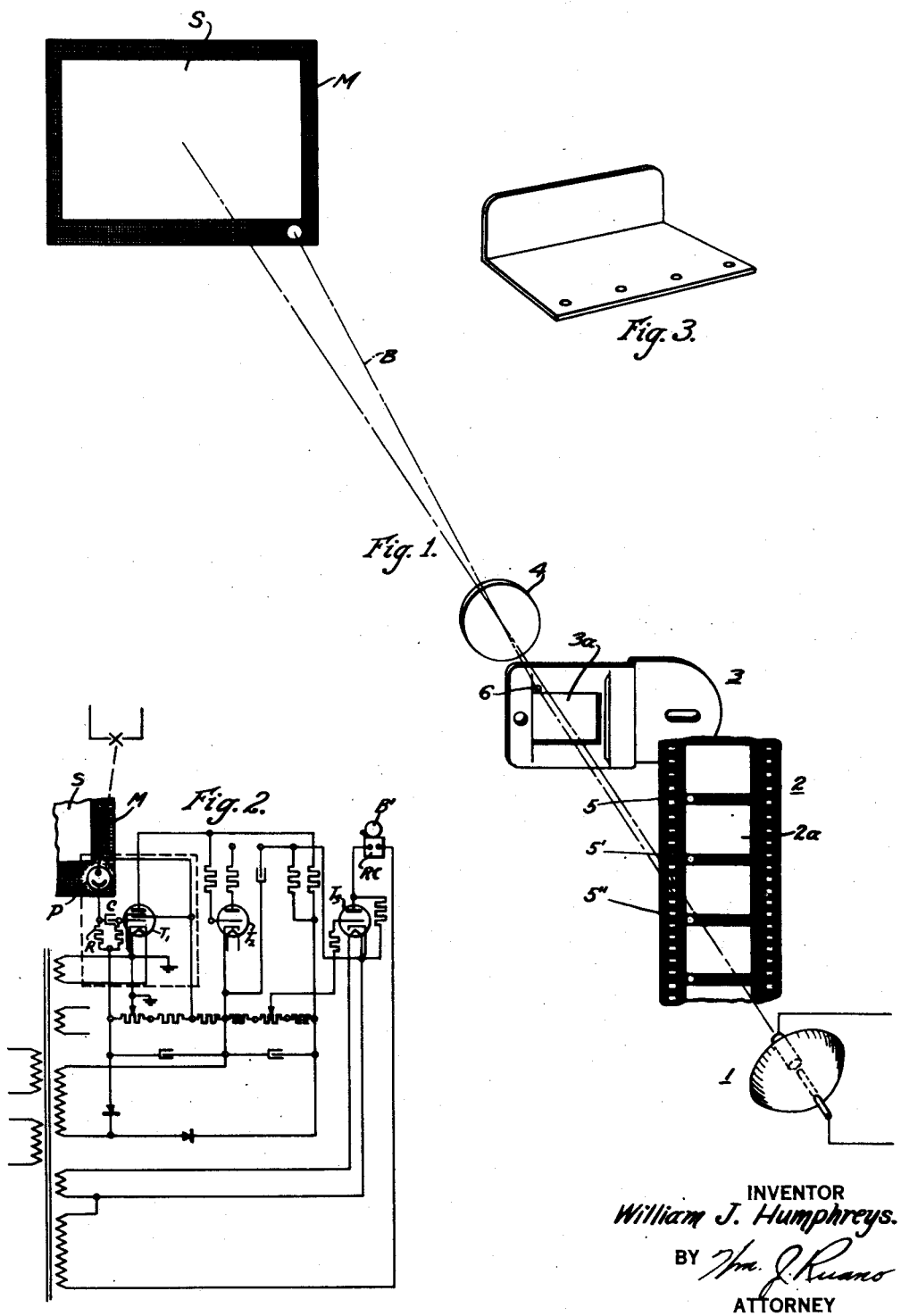
INVENTOR
William J. Humphreys.
BY
ATTORNEY Patented Mar. 24, 1942

2,277,438

UNITED STATES PATENT OFFICE 2,277,438

MOTION PICTURE SYSTEM

William J. Humphreys, Pittsburgh, Pa.

Application April 19, 1941, Serial No. 389,442

8 Claims. (Cl. 88—17)

My invention relates to a motion picture projection system and more particularly to an indicator system for indicating to the operator when a predetermined portion of the film reel has been reached, for example, the portion at which to change over from one projection machine to another when the end of a reel of film is reached.

An object of my invention is to provide an indicating means which is simple and inexpensive yet highly reliable in operation.

A more specific object of my invention is to provide a small hole adjacent the perimeter of a film aperture plate and to provide corresponding light spots along the framing line of a plurality of concluding frames of a film reel, so that a beam of light may be projected on the masked perimeter portion of a moving picture screen or at any point (such as on the stage) exterior of the picture on the screen.

Other objects and advantages will become more apparent from a study of the following specification when considered in conjunction with the accompanying drawing, in which:

Figure 1 is a schematic showing of a motion picture projection system with the parts shown in perspective and exploded, Fig. 2 is a modification of the invention shown in Fig. 1, and Fig. 3 is a perspective view of a stencil element for marking spots on the film.

In the past, the usual method of providing a change-over indicating means in motion picture apparatus was to provide a plurality of light spots (or dark spots) within the frame (i. e., picture) portion of a plurality of concluding frames near the end of a film reel. I have found that such system is objectionable inasmuch as the change-over indicator spots are projected onto the screen and are quite noticeable and objectionable to the audience. Furthermore, when dark spots are used, it may so happen that the concluding frames of a film reel may include a scene which has a dark background in which event, the dark spot projected on a dark background would be hardly noticeable to the movie projector operator. Operators, in order to avoid this objection, frequently make marks of their own on the film that is, they will scratch light spots roughly at the points where the dark spots appear so as to throw a light spot image on the screen. This is quite objectionable because such light spots are usually made large and quite irregular giving an undesirable appearance to the picture. Upon subsequent use of the film by another "moviehouse," these spots may be blotted over with ink and different index spots may be placed on the film. Films are thus unnecessarily defaced and worn giving rise to possible trouble in projection.

In accordance with my invention, all of the above disadvantages are eliminated. I have found that by providing a light spot on each of a plurality of framing lines of a film at the termination of a film reel (or at any other particular portion of a film) and that by providing a corresponding small hole immediately adjacent the perimeter of the film aperture plate, I am able to provide a luminous beam of light which is projected exteriorly of the picture on the screen. I prefer to project such beam on the masked portion of the screen, that is, the dark perimeter portion thereof. Since such masked portion is usually black, the projection of the luminous beam (a light spot) thereon will provide a visual indication to the operator which is not too bright (because of the black background of the masked portion) and yet which is sufficiently bright so as to be readily noticeable by the projection machine operator. If, due to the low positioning of the screen on the stage, it is impossible to throw the beam on the masked portion of the screen, then it is desirable to throw it onto the floor of the stage or some other object exterior of the screen.

Referring more particularly to Figure 1, numeral 1 denotes an arc light in a motion picture projection machine (not shown). Numeral 2 denotes a predetermined portion of a film, for example, the concluding portion of a reel on which must be placed a change-over indicating means so as to indicate to the operator that the second projection machine must be started when such film portion is reached. Numeral 3 denotes an aperture plate which has an aperture 3a therein which comes into registry with the frames 2a of the film or approximately so. The film trap which is associated with aperture plate 3 and which cooperates with the film gate has not been shown since it forms no part of my present invention, and since it is well known in the art as evidenced by the U. S. patent to Augusto Dina No. 1,981,033, issued November 20, 1934. Numeral 4 denotes the lens of the projection machine. A screen S is provided having a masked or blackened perimeter portion M. Between each of the film frames 2a, there is provided a darkened line known as the framing line.

In accordance with my invention, I provide a plurality of small light spots 5, 5', 5'', (usually four or five in number) one on each framing line and at the same point on successive framing lines near the end of the film reel and I provide a small hole 6 (approximately 1/32" in diameter) immediately adjacent the aperture 3a of the aperture plate 3 so that it will come into registry with the successive light spots 5, 5', 5", etc. Spots 5, 5', 5", etc., are generally larger than hole 6 to take care of inaccuracies of framing of the picture and improper guiding of the films. They may be square if desired and of the thickness of the framing line. As a result, when the end of the film reel is reached, the small light spots 5, 5', 5" will come into registry with the small hole 6 so as to throw successive beams of light B on to the masked portion of the screen. In some instance, if the screen is too low, the light beam can be projected onto the stage floor or in fact, onto any suitable object exterior of the screen. Such spot may be hidden from the audience by a suitable mask (not shown). It will be apparent that this small hole 6 may be placed immediately adjacent either of the horizontal maginal edges (upper or lower) of the aperture 3a. I prefer, however, to place the small hole at the upper left-hand corner of the aperture 3a as shown, so that a beam of light will be projected onto the lower right-hand corner of the mask of the screen. The reason for such placement is that it will be less noticeable to the audience and that it will be at a portion of the film which is opposite from the sound track. When the operator notices the light spot on the lower right-hand corner of the screen mask he will know that it is time to start up the second projecting machine.

A series of light spots similar to 5, 5', 5", etc., may be placed at other portions of the film other than the change-over position (which is usually one foot from the end of the reel). For instance, a series of spots may be additionally placed at the "start motor" position for the second projector, that is about 11 ft. before the "change-over" position, and another series of spots could be placed at a portion on the film to give about a two minute warning to the operator (i e., at a point 180 ft. from the end of the film since the film usually travels at a speed of 90 ft. per minute.

Fig. 2 shows a modification of my invention for operating an audible (or even a visible) indicating means including a phototube P located at the lower right hand portion of the mask (or at any point along the light beam B, for instance, adjacent the projector).

Since there is generally considerable fluctuation of line voltage in movie houses, the well known types of photoelectric circuits operating on a static (or predetermined value of) grid voltage of an electric discharge tube are not generally suitable since changes in line voltage will affect the trigger voltage of the tube. A voltage regulator would solve the problem but such regulator adds too much to the cost of the equipment.

I propose the use of a photoelectric circuit in which the discharge tubes are triggered in accordance with the "rate of change" of illumination of the phototube instead of the "amount" of change thereof. I depend on the suddenness of the change from dark to light to operate a suitable indicating means, such as a buzzer, chime, lamp, etc. In other words if beam B would "very slowly" change from dark to light, the indicating means would not operate because the "rate of change" was too slow. More specifically, I show a circuit involving a thermionic tube $T_1$ and two Thyratron tubes $T_2$ and $T_3$. Normally, when no beam appears on the screen mask, the phototube P is non-conducting, tubes $T_1$ and $T_2$ are conducting and tube $T_3$ is non-conducting. Condenser C is charged as shown. When registry of one of the holes 5, 5', 5", etc., comes into registry with hole 6 causing illumination the phototube P, condenser C discharges through resistor R placing a high negative bias on the grid of tube $T_1$. The grid of tube $T_2$ becomes more negative with respect to its cathode causing $T_2$ to also become non-conducting. The grid of tube $T_3$, however, becomes more positive with respect to its cathode causing conduction of tube $T_3$ and energization of relay coil RC. Energization of such coil will effect operation of a suitable alarm means such as a chime or buzzer B'.

Fig. 3 shows a stencil having suitable holes through which an instrument with a sharp point can be employed to scratch light spots on the framing lines of a portion of the film.

It will be obvious that, if the occurrence of the beam of light B is to effect automatic starting of the second machine, any suitable motor starting system well known in the art may be initiated thereby as the result of energization of relay coil RC.

I am, of course, aware that others, particularly after having had the benefit of the teachings of my invention, may devise other devices embodying my invention, and I, therefore, do not wish to be limited to the specific showings made in the drawing and the descriptive disclosure hereinbefore made, but wish to be limited only by the scope of the appended claims.

I claim as my invention:

1. In a motion picture projection system, indication means comprising, in combination, a movie screen, a projecting machine aperture plate, a film having a plurality of frames separated by framing lines which frames are adapted to register with the aperture of said aperture plate, a small hole in said aperture plate immediately adjacent the perimeter of said aperture, a light spot located in each framing line of a plurality of frames on a predetermined portion of the film, which spot is adapted to register with said small hole so as to project successive beams of light exteriorly of said screen.

2. A motion picture projection system, as set forth in claim 1, in which said small hole is located in the vicinity of a corner of the aperture plate so as to throw a beam of light on the lower right-hand corner of said screen.

3. In a motion picture projection system, change-over indication means comprising, in combination, a movie screen having a masked perimeter portion, a projecting machine aperture plate, a film having a plurality of frames separated by framing lines which frames are adapted to register with the aperture of said aperture plate, a small hole in said aperture plate immediately adjacent the perimeter of said aperture, a light spot located in each framing line of a plurality of frames on a predetermined portion of the film, which spot is adapted to register with said small hole so as to project successive beams of light onto the masked portion of said screen.

4. A motion picture projection system, as set forth in claim 3, in which said small hole is located in the vicinity of a corner of the aperture plate so as to throw a beam of light on the lower right-hand corner of said screen.

5. Apparatus as set forth in claim 1 together with photoelectric control means responsive to said successive beams of light.

6. Apparatus as set forth in claim 3 together with photoelectric control means responsive to said successive beams of light.

7. Apparatus as set forth in claim 1 together with photoelectric control means responsive only to the rate of change of illumination of said beams of light.

8. Apparatus as set forth in claim 1 together with photoelectric control means responsive only to the rate of change of illumination of said beams of light, and indicating means operated by said photoelectric control means upon projection of said beams of light through said small hole.

WILLIAM J. HUMPHREYS.